US012587908B2

(12) United States Patent
Sharma et al.

(10) Patent No.: US 12,587,908 B2
(45) Date of Patent: Mar. 24, 2026

(54) HANDOVER OF TERMINAL BETWEEN NODES SUPPORTING TWO RATS

(71) Applicant: Sony Group Corporation, Tokyo (JP)

(72) Inventors: Vivek Sharma, Basingstoke (GB); Martin Warwick Beale, Basingstoke (GB); Brian Alexander Martin, Basingstoke (GB); Shin Horng Wong, Basingstoke (GB); Hideji Wakabayashi, Basingstoke (GB); Shinichiro Tsuda, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 695 days.

(21) Appl. No.: 16/475,685

(22) PCT Filed: Jan. 2, 2018

(86) PCT No.: PCT/EP2018/050031
§ 371 (c)(1),
(2) Date: Jul. 3, 2019

(87) PCT Pub. No.: WO2018/127477
PCT Pub. Date: Jul. 12, 2018

(65) Prior Publication Data
US 2019/0380066 A1 Dec. 12, 2019

(30) Foreign Application Priority Data
Jan. 4, 2017 (EP) .................................... 17150280

(51) Int. Cl.
*H04W 36/00* (2009.01)
*H04W 36/14* (2009.01)
(Continued)

(52) U.S. Cl.
CPC .. *H04W 36/0011* (2013.01); *H04W 36/00698* (2023.05); *H04W 36/142* (2023.05);
(Continued)

(58) Field of Classification Search
CPC . H04W 36/14; H04W 36/0022; H04W 76/27; H04W 36/0066; H04W 88/06;
(Continued)

(56) References Cited

U.S. PATENT DOCUMENTS

2013/0095789 A1 4/2013 Keevill et al.
2015/0358865 A1* 12/2015 Fu ...................... H04W 36/0033
455/436
(Continued)

FOREIGN PATENT DOCUMENTS

WO 2018/127339 A1 7/2018

OTHER PUBLICATIONS

Office Action issued Apr. 20, 2020 in European Patent Application No. 18 700 133.4, 14 pages.
(Continued)

*Primary Examiner* — The Hy Nguyen
(74) *Attorney, Agent, or Firm* — XSENSUS LLP

(57) ABSTRACT

A method for handing over a terminal device from a source network infrastructure element to a target network infrastructure element in a wireless telecommunications system supporting communications in accordance with a first radio access technology and a second, different, radio access technology, wherein the source network infrastructure element is operable to communicate with the terminal device in accordance with the first radio access technology and the second radio access technology using a radio bearer supported by a first layer-2 protocol stack for communications in accordance with the first radio access technology and a
(Continued)

second layer-2 protocol stack for communications in accordance with the second radio access technology.

11 Claims, 7 Drawing Sheets

(51) Int. Cl.
| | |
|---|---|
| H04W 36/24 | (2009.01) |
| H04W 88/06 | (2009.01) |
| H04W 88/10 | (2009.01) |

(52) U.S. Cl.
CPC .......... *H04W 36/249* (2023.05); *H04W 88/06* (2013.01); *H04W 88/10* (2013.01)

(58) Field of Classification Search
CPC ... H04W 36/0033; H04W 76/15; H04W 8/08; H04W 36/0069; H04W 36/0083; H04W 24/10; H04W 36/0058; H04W 8/24; H04W 36/08; H04W 36/0055; H04W 36/0085; H04W 36/0094; H04W 36/04; H04W 36/12; H04W 36/0061; H04W 48/18; H04W 76/11; H04W 76/16; H04W 24/02; H04W 24/08; H04W 36/0011; H04W 36/26; H04W 36/36; H04W 88/10; H04W 16/14; H04W 28/06; H04W 36/00; H04W 36/0077; H04W 36/0079; H04W 36/00835; H04W 36/00837; H04W 36/06; H04W 36/125; H04W 40/36; H04W 76/19; H04W 76/30; H04W 80/04; H04W 80/08; H04W 36/0016; H04W 36/0072; H04W 36/0088; H04W 36/34; H04W 48/20; H04W 4/50; H04W 52/0206; H04W 76/10; H04W 76/25; H04L 43/08; H04L 5/0096; H04J 2211/005

See application file for complete search history.

(56) References Cited

U.S. PATENT DOCUMENTS

| | | | | |
|---|---|---|---|---|
| 2016/0198371 | A1 | 7/2016 | Zhang et al. | |
| 2016/0212666 | A1 | 7/2016 | Zalzalah et al. | |
| 2016/0302064 | A1 | 10/2016 | Tsai et al. | |
| 2017/0094495 | A1* | 3/2017 | Ke | H04L 67/34 |
| 2017/0094570 | A1* | 3/2017 | Kim | H04W 72/044 |
| 2018/0115933 | A1* | 4/2018 | Radulescu | H04W 36/0066 |
| 2018/0192333 | A1* | 7/2018 | Wu | H04W 36/0011 |
| 2018/0220336 | A1* | 8/2018 | Hong | H04W 36/0016 |
| 2019/0261240 | A1* | 8/2019 | Fang | H04W 28/0268 |
| 2021/0029602 | A1* | 1/2021 | Fang | H04W 36/0064 |
| 2021/0297915 | A1* | 9/2021 | Decarreau | H04W 36/144 |
| 2024/0049067 | A1* | 2/2024 | Duan | H04W 36/13 |

OTHER PUBLICATIONS

Ericsson, "Intra- and inter-eNB HO for eLWA without WT change", 3GPP TSG-RAN WG2 #95, R2-165476, Gothenburg, Sweden, Aug. 22-26, 2016, XP051126950, 4 pages.

Richard Burbidge, "LTE-WLAN Aggregation (LWA) and LTE WLAN Radio Level Integration with IPsec Tunnel (LWIP)" IEEE meeting in Macao, Mar. 13-18, 2016, XP055425055, 24 pages.

Samsung, "Handover without WT change", 3GPP TSG-RAN WG3 #93bis, R3-162141, Sophia Antipolis, French, Oct. 10-14, 2016, XP051151802, 4 pages.

Qualcomm Incorporated, "Principles for LTE mobility without WT change", 3GPP TSG-RAN2 Meeting #94, R2-164191, Nanjing, China, May 23-27, 2016, XP051105480, 2 pages.

Alcatel-Lucent, "Correction of SN Status Transfer and MME Status Transfer", 3GPP TSG RAN WG3 Meeting #83bis, R3-140793, San Jose del Caba, Mexico, Mar. 31-Apr. 4, 2014, XP050795483, 3 pages.

International Search Report and Written Opinion mailed on Feb. 13, 2018 for PCT/EP2018/050031 filed on Jan. 2, 2018, 13 pages.

3GPP, 3rd Generation Partnership Project; Technical Specification Group Radio Access Network; Evolved Universal Terrestrial Radio Access (E-UTRA) and Evolved Universal Terrestrial Radio Access Network (E-UTRAN); Stage 2 Release 13, 3GPP TS 36.300 V13.6.0, Dec. 2016, pp. 1-314.

Holma et al., "LTE for UMTS OFDMA and SC-FDMA Based Radio Access", Wiley 2009, System Architecture Based on 3GPP SAE, 11 pages.

3GPP, 3rd Generation Partnership Project; Technical Specification Group Radio Access Network; Evolved Universal Terrestrial Radio Access Network (E-UTRAN); X2 application protocol (X2AP), Release 13, 3GPP TS 36.423 V13.2.0, Dec. 2015, pp. 1-230.

3GPP, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 Release 13, 3GPP TS 36.300 V13.2.0, Dec. 2015, pp. 1-290.

3GPP, 3rd Generation Partnership Project; Technical Specification Group Radio Access Network; Evolved Universal Terrestrial Radio Access (E-UTRA); Radio Resource Control (RRC); Protocol specification, Release 13, 3GPP TS 36.331 V13.0.0, Dec. 2015, pp. 1-507.

NTT Docomo, "New SID Proposal: Study on New Radio Access Technology", 3GPP TSG RAN Meeting No. 71 RP-160671, Goteborg, Sweden, Mar. 7-10, 2016, 8 pages.

Office Action issued Oct. 16, 2020 in European Patent Application No. 18 700 133.4, 20 pages.

Huawei, et al., "Coexistence between NR and LTE", 3GPP TSG RAN WG1 Meeting #87, R1-1611681, Reno, USA, Nov. 14-18, 2016, XP051175653, 6 pages.

Qualcomm Incorporated, "User Plane Details for Handover without WT Change", 3GPP TSG-RAN2 Meeting #95bis, R2-167114, Kaohsiung, Taiwan, Oct. 10-14, 2016, XP051151512, 5 pages.

3GPP Standard, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2, (Release 14)", 3GPP TS 36.300, V14.1.0, Dec. 30, 2016, XP051230306, 317 pages.

3GPP, "3rd Generation Partnership Project; Technical Specification Group Radio Access Network; Evolved Universal Terrestrial Radio Access (E-UTRA); Radio Resource Control (RRC); Protocol specification, (Release 14)", 3GPP TS 36.331, V14.1.0 Dec. 28, 2016, XP051203538, 654 pages.

Samsung, "LWA carrier/AP identification", 3GPP TSG-RAN WG2 Meeting #93, R2-161113, Malta, Feb. 15-19, 2016, XP051055102, 10 pages.

Samsung, "Mobility Enhancedment for LWA", 3GPP TSG-RAN WG3 #91bis, R3-160687, Bangalore, India, Apr. 11-15, 2016, XP051083007, 4 pages.

HTC, "Delta configuration for eLWA", 3GPP TSG-RAN2 Meeting #96, R2-167604, Reno, USA, Nov. 14-18, 2016, XP051177200, 5 pages.

3GPP, "3rd Generation Partnership Project; Technical Specification Group Radio Access Network; Study on New Radio Access Technology; Radio Access Architecture and Interfaces, (Release 14)", 3GPP TR 38.801 V1.0.0, Dec. 8, 2016, XP051229946, 72 pages.

Fujitsu, "Scenarios and prioritizations for dual connectivity", 3GPP TSG-RAN WG3 Meeting #83, R3-140093, Prague, Czech Republic; Feb. 9, 2014, XP050738534, 5 pages.

\* cited by examiner

HANDOVER OF TERMINAL BETWEEN NODES SUPPORTING TWO RATS

CROSS-REFERENCE TO RELATED APPLICATIONS

The present application is based on PCT filing PCT/EP2018/050031, filed Jan. 2, 2018 which claims priority to EP 17150280.0, filed Jan. 4, 2017, the entire contents of each are incorporated herein by reference.

BACKGROUND

Field

The present disclosure relates to telecommunications apparatus and methods, and in particular to handling mobility, e.g. handover/handoff procedures, in wireless telecommunications systems.

DESCRIPTION OF RELATED ART

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly.

However, whilst fourth generation networks can support communications at high data rate and low latencies from devices such as smart phones and tablet computers, it is expected that future wireless communications networks, will be expected to efficiently support communications with a much wider range of devices associated with a wider range of data traffic profiles, for example including reduced complexity devices, machine type communication devices, high resolution video displays and virtual reality headsets. Some of these different types of devices may be deployed in very large numbers, for example low complexity devices for supporting the "The Internet of Things", and may typically be associated with the transmissions of relatively small amounts of data with relatively high latency tolerance, whereas other types of device, for example supporting high-definition video streaming, may be associated with transmissions of relatively large amounts of data with relatively low latency tolerance.

In view of this there is expected to be a desire for future wireless communications networks, for example those which may be referred to as 5G or new radio (NR) system/ new radio access technology (RAT) systems, as well as future iterations/releases of existing systems, to efficiently support connectivity for a wide range of devices associated with different applications and different characteristic data traffic profiles, and to operate over a large range of frequencies, for example from hundreds of MHz to 100 GHz. This can be expected to result in networks with different architectures and operating principles as compared to currently deployed networks.

Example use cases currently considered to be of interest for next generation wireless communication systems include so-called Enhanced Mobile Broadband (eMBB) and Ultra Reliable and Low Latency Communications (URLLC). See, for example, the 3GPP document RP-160671, "New SID Proposal: Study on New Radio Access Technology," NTT DOCOMO, RAN #71 [1].

The inventors have recognized introduction of new radio access technology (RAT) systems/networks gives rise to new challenges for providing efficient operation for devices operating in new RAT networks, including devices able to operate in both new RAT networks (e.g. a 3GPP 5G network) and currently deployed RAT networks (e.g. a 3GPP 4G network). As discussed further herein, one particular area where new approaches may be helpful is in relation to handovers between network nodes responsible for communicating with a terminal device, which may be referred to as mobility management. It will be appreciated handovers may result from a device physically moving between coverage areas of different cells or from changing radio conditions associated with different cells for a static device, and the term mobility management may be used for both scenarios.

In view of the above, there is a desire for new approaches for efficiently handling mobility in wireless telecommunications systems.

SUMMARY

The present disclosure can help address or mitigate at least some of the issues discussed above.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Figure 1:
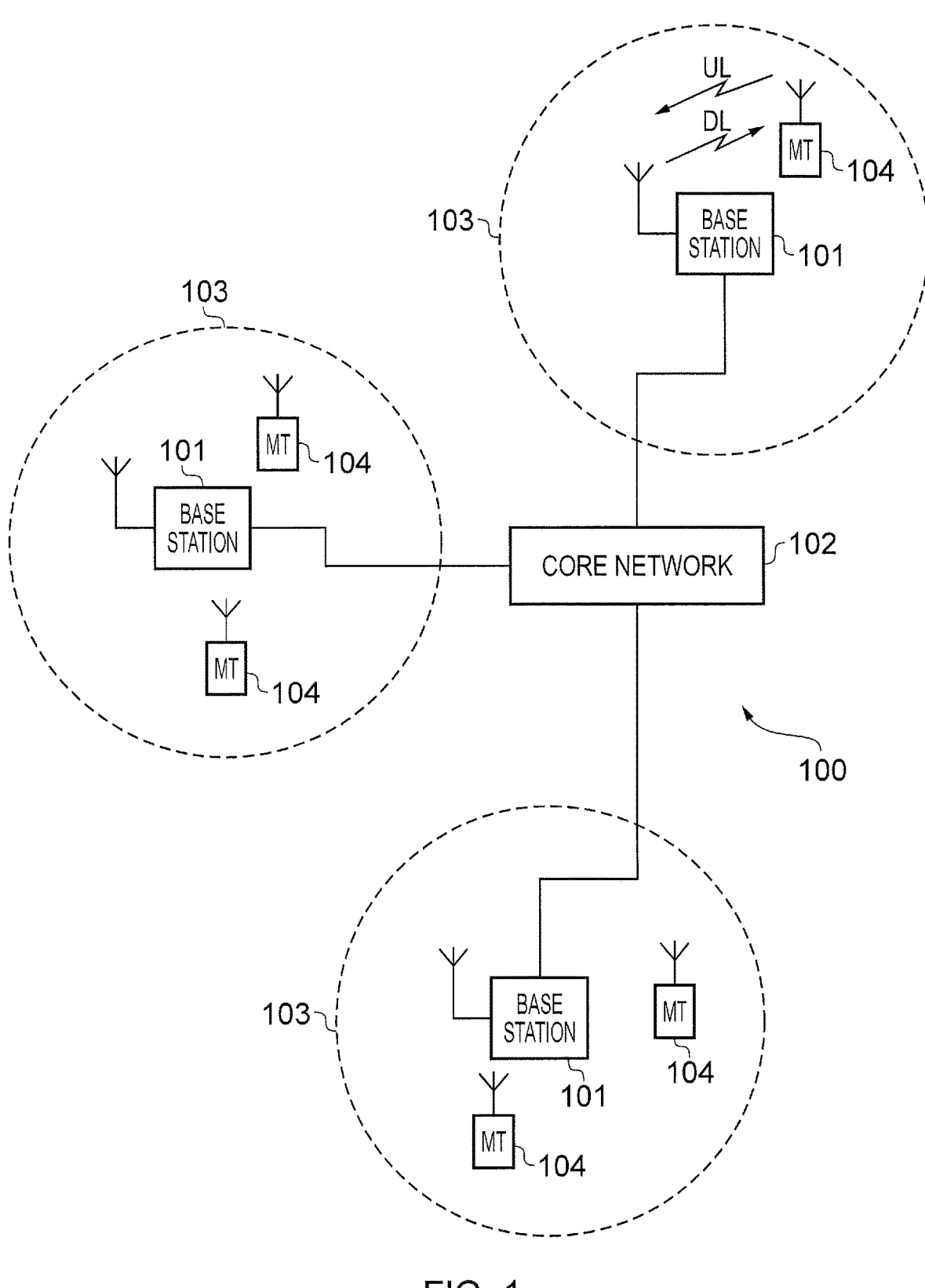
FIG. 1 schematically represents some aspects of a LTE-type wireless telecommunication network which may be configured to operate in accordance with certain embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP (RTM) body, and also described in many books on the subject, for example, Holma H. and Toskala A [2]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink. Data is transmitted from terminal devices 104 to the base stations 101 via a radio uplink. The core network 102 routes data to and from the terminal devices 104 via the respective base stations 101 and provides functions such as authentication, mobility management, charging and so on. Terminal devices may also be referred to as mobile stations, user equipment (UE), user terminal, mobile radio, communications device, and so forth. Base stations, which are an example of network infrastructure equipment, may also be referred to as transceiver stations/nodeBs/e-nodeBs, eNB, gNB, and so forth. Furthermore, it will be appreciated the terms base station and cell may also sometimes be used interchangeably, for example, the process of a terminal device connecting to the radio access part of a wireless telecommunications system might be referred to as accessing a cell or accessing a base station (or more generally a radio network infrastructure element). Nonetheless, it will be appreciated in some cases the physical apparatus comprising a base station (radio network infrastructure element) may comprise equipment for supporting more than one communication cell and in such cases it can still be appropriate to draw a distinction between base stations and cells.

Figure 2:
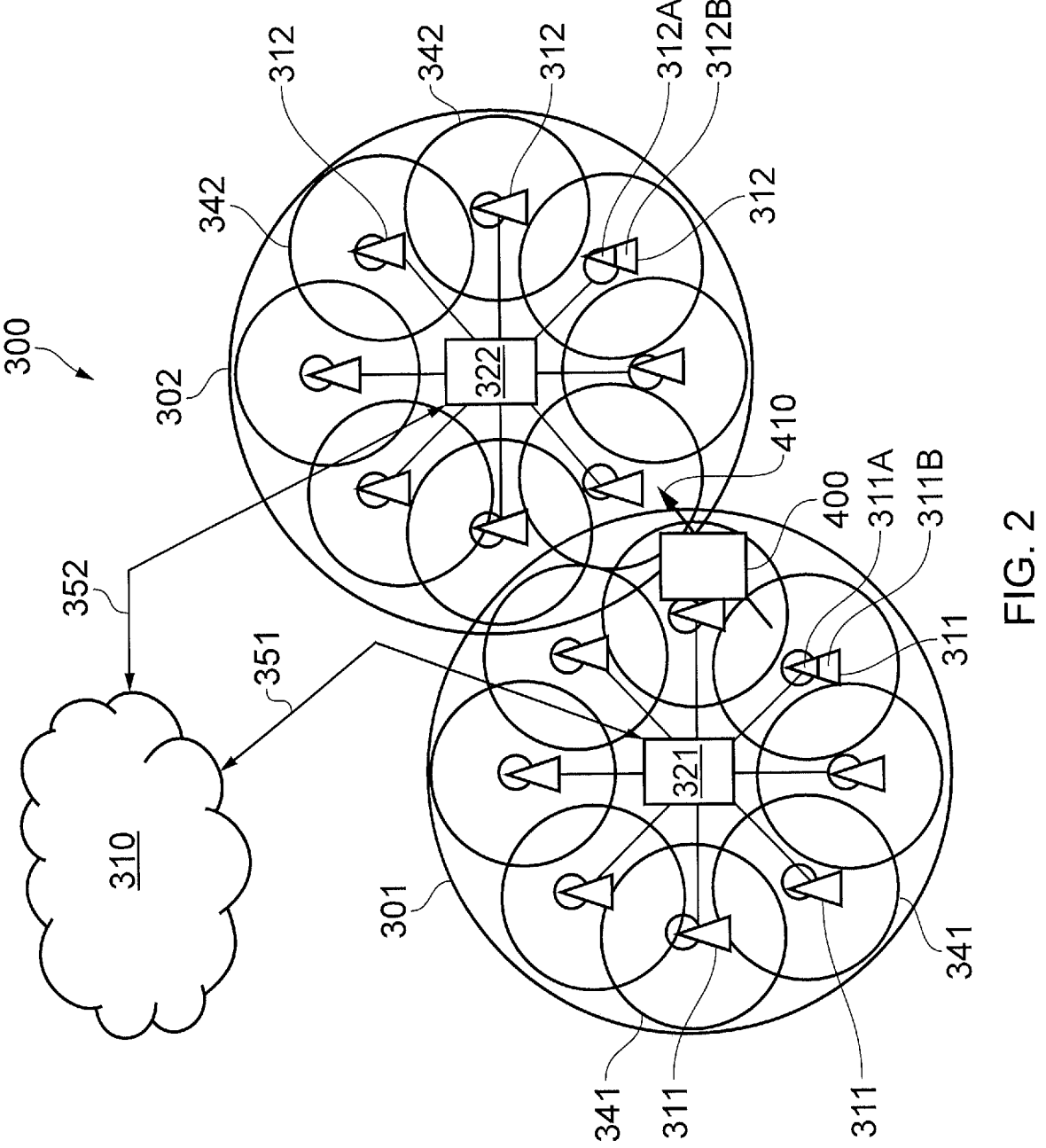
FIG. 2 schematically represents some aspects of a new radio access technology (RAT) wireless telecommunications network which may be configured to operate in accordance with certain embodiments of the present disclosure.

FIG. 2 is a schematic diagram illustrating a network architecture for a new RAT wireless mobile telecommunications network/system 300 based on previously proposed approaches which may also be adapted to provide functionality in accordance with embodiments of the disclosure described herein. The new RAT network 300 represented in FIG. 2 comprises a first communication cell 301 and a second communication cell 302. Each communication cell 301, 302, comprises a controlling node (centralised unit) 321, 322 in communication with a core network component 310 over a respective wired or wireless link 351, 352. The respective controlling nodes 321, 322 are also each in communication with a plurality of distributed units (radio access nodes/remote transmission and reception points (TRPs)) 311, 312 in their respective cells. Again, these communications may be over respective wired or wireless links. The distributed units 311, 312 are responsible for providing the radio access interface for terminal devices connected to the network. Each distributed unit 311, 312 has a coverage area (radio access footprint) 341, 342 which together define the coverage of the respective communication cells 301, 302.

In terms of broad top-level functionality, the core network component 310 of the new RAT telecommunications system represented in FIG. 2 may be broadly considered to correspond with the core network 102 represented in FIG. 1, and the respective controlling nodes 321, 322 and their associated distributed units/TRPs 311, 312 may be broadly considered to provide functionality corresponding to base stations of FIG. 1. The term network infrastructure equipment/element may be used to encompass these elements and more conventional base station type elements of wireless telecommunications systems. Depending on the application at hand the responsibility for scheduling transmissions on the radio interface between the respective distributed units and the terminal devices may lie with the controlling node/centralised unit and/or the distributed units/TRPs.

A terminal device 400 is represented in FIG. 2 within the coverage area of the first communication cell 301. This terminal device 400 may thus exchange signalling with the first controlling node 321 in the first communication cell via one of the distributed units 311 associated with the first communication cell 301. In some cases communications for a given terminal device are routed through only one of the distributed units, but it will be appreciated in some other implementations communications associated with a given terminal device may be routed through more than one distributed unit, for example in a soft handover scenario and other scenarios. The particular distributed unit(s) through which a terminal device is currently connected through to the associated controlling node may be referred to as active distributed units for the terminal device. The active subset of distributed units for a terminal device may comprise one or more than one distributed unit (TRP). The controlling node 321 is responsible for determining which of the distributed units 311 spanning the first communication cell 301 is responsible for radio communications with the terminal device 400 at any given time (i.e. which of the distributed units are currently active distributed units for the terminal device). Typically this will be based on measurements of radio channel conditions between the terminal device 400 and respective ones of the distributed units 311. In this regard, it will be appreciated the subset of the distributed units in a cell which are currently active for a terminal device will depend, at least in part, on the location of the terminal device within the cell (since this contributes significantly to the radio channel conditions that exist between the terminal device and respective ones of the distributed units).

In the example of FIG. 2, two communication cells 301, 302 and one terminal device 400 are shown for simplicity, but it will of course be appreciated that in practice the system may comprise a larger number of communication cells (each supported by a respective controlling node and plurality of distributed units) serving a larger number of terminal devices.

It will further be appreciated that FIG. 2 represents merely one example of a proposed architecture for a new RAT telecommunications system in which approaches in accordance with the principles described herein may be adopted, and the functionality disclosed herein may also be applied in respect of wireless telecommunications systems having different architectures. That is to say, the specific wireless telecommunications architecture for a wireless telecommunications system adapted to implement functionality in accordance with the principles described herein is not significant to the principles underlying the described approaches.

Certain embodiments of the invention as discussed herein may be implemented in wireless telecommunication systems/networks according to various different architectures, such as the example architectures shown in FIGS. 1 and 2 or in other architectures that may be adopted. It will thus be appreciated the specific wireless telecommunications architecture in any given implementation is not of primary significance to the principles described herein. In this regard, certain embodiments of the disclosure may be described generally in the context of a radio network infrastructure element communicating with a terminal device, wherein the specific nature of the radio network infrastructure element and the terminal device will depend on the network infrastructure architecture for the implementation at hand. For example, in some scenarios the radio network infrastructure element may comprise a base station, such as an LTE-type base station 101 as shown in FIG. 1 which is adapted to provide functionality in accordance with the principles described herein, and in other examples the network infrastructure equipment may comprise a control unit 321, 322 and/or a TRP 311, 312 of the kind shown in FIG. 2 which is adapted to provide functionality in accordance with the principles described herein. For the sake of simplicity the term base station may be used herein to refer to any form of radio network infrastructure element configured to provide functionality in accordance with the principles described herein.

It may be expected that as new RAT networks start to be deployed they will, at least initially, be required to interoperate with existing networks. This is so that existing networks can provide coverage in regions where the new RAT network has not yet been deployed. There may also be expected to be locations where an existing network and a new RAT network are both available, and it may be advantageous in these regions for terminal devices to be able to simultaneously access both the conventional network and the new RAT network. Certain embodiments of the disclosure are concerned with interoperability between conventional networks and new RAT networks, and in particular in respect of mobility/handovers procedures. As noted above, the principles described herein may be applied in respect of various different network architectures. Nonetheless, for the sake of providing a concrete example and convenience of terminology, for the main examples discussed herein the conventional network may be referred to as an LTE network and the new RAT network may be referred to as an NR network.

As noted above, it is to be expected that for at least for an initial deployment period, NR and LTE are expected to coexist. That is to say it is expected wireless telecommunication may support communications with a terminal device using both a first (legacy) radio access technology, such as LTE, and a second (new) radio access technology, such as NR. Coexistence can be implemented by allowing the first radio access technology and the second radio access technology to share physical radio transmission resources in various ways, for example as schematically represented in FIGS. 3 and 4.

Figure 3:
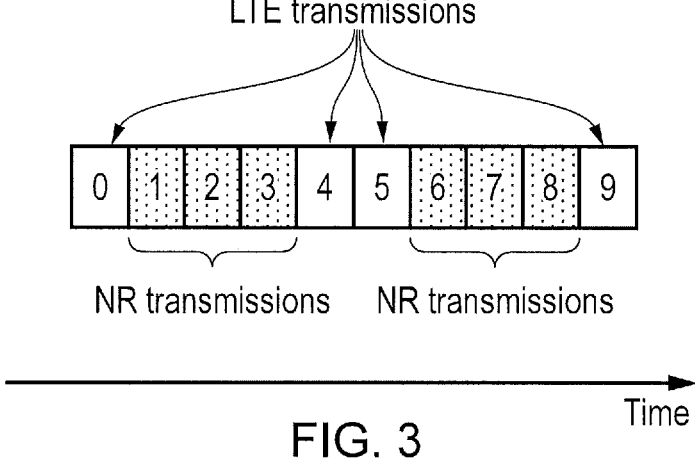
FIGS. 3 and 4 schematically represent how physical radio resources may be allocated to support transmissions in accordance with an LTE radio access technology and a new radio access technology, NR, in a time multiplexed manner (FIG. 3) and a frequency multiplexed manner (FIG. 4)

FIG. 3 schematically represents one scheme for allowing transmissions associated with a first radio access technologies (LTE) and transmissions associated with a second radio access technology (NR) to coexist, in this example on the same frequency channel using time multiplexing. With this example approach a conventional LTE radio subframe structure may be used to support LTE transmissions, but with subframes available to support LTE multicast-broadcast single-frequency network (MBSFN) transmissions instead being used to support NR transmissions, e.g. as schematically represented in FIG. 3 with the subframes numbered 0, 4, 5 and 9 being used for LTE transmissions and the subframes numbered 1, 2, 3, 6, 7 and 8 being used for NR transmissions.

Figure 4:
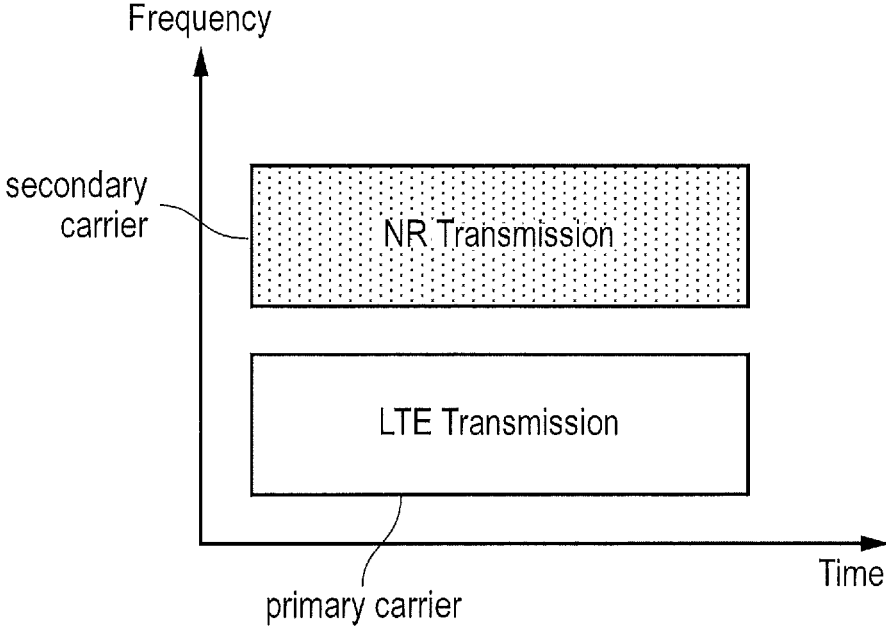

FIG. 4 schematically represents another scheme for allowing transmissions associated with a first radio access technologies (LTE) and transmissions associated with a second radio access technology (NR) to coexist. This example approach is based on multicarrier operation with one carrier being used to support LTE transmissions and another carrier being used to support NR transmissions, e.g. as schematically represented in FIG. 4 with a primary carrier being used for LTE transmissions and a secondary carrier being used for NR transmissions.

Although it is expected that legacy (e.g. LTE) and new RAT/5G (NR) radio access technologies will coexist in wireless telecommunications systems, certain elements operating in the wireless telecommunications systems may not support both radio access technologies. For example, older terminal devices may only support the LTE radio access technology, newer terminal devices may only support the enhanced radio access technology, and yet other terminal devices may support both radio access technologies. Similarly, different network infrastructure equipment elements may support one or other or both of the radio access technologies, for example according to the stage of the NR roll-out programme in which these particular network infrastructure equipment elements were deployed/upgraded.

As noted above, the inventors have recognised that the coexistence of different radio access technologies, and in particular with the possibility that different network infrastructure elements will not all support the same radio access technologies, gives rise to additional considerations for supporting mobility, and in particular, handover procedures for handing over a terminal device from a first (source) network infrastructure element to a second (target) network infrastructure element, in next generation wireless telecommunications networks.

Figure 5:
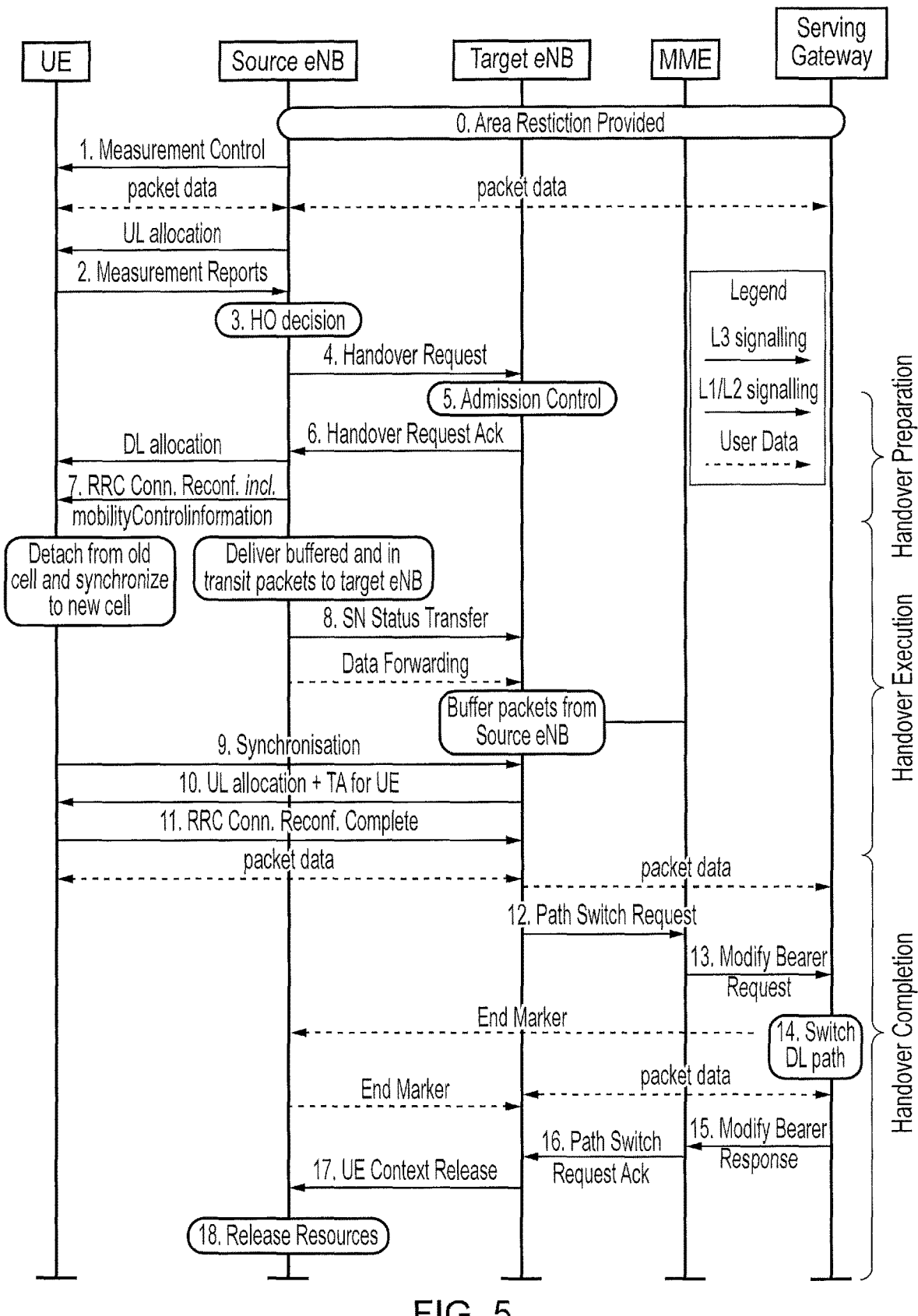
FIG. 5 is a signalling ladder diagram schematically representing aspects of an established handover procedure that may be modified to provide functionality in accordance with certain embodiments of the present disclosure.

FIG. 5 is a ladder diagram showing signalling exchange between a terminal device ("UE"), a source base station ("Source eNB"), a target base station ("target eNB"), a mobility management entity ("MME") and a serving gateway ("Serving Gateway") for a conventional Intra-MME/

Serving gateway LTE handover procedure for an RRC (Radio Resource Control) connected terminal device in a conventional LTE-based wireless telecommunications network. This procedure is well established and well understood and described in the relevant standards, for example, see ETSI TS 136 300 V13.2.0 (2016-01)/3GPP TS 36.300 version 13.2.0 Release 13 [3] (in particular Section 10.1), and so is not described in detail herein in the interest of brevity.

As discussed further herein, certain embodiments of the disclosure are directed towards schemes for facilitating handover procedures from source base station (i.e. a first radio network infrastructure element) which supports two radio access technologies (e.g. LTE and NR) to a target base station (i.e. a second radio network infrastructure element) which only supports one of the radio access technologies (e.g. LTE). Accordingly, this may correspond to a situation in which a terminal device is initially being served by a network infrastructure element that has been upgraded to support NR in addition to LTE as part of a network operator's NR roll out program being handed over to a network infrastructure element that has not yet been upgraded to support NR and so only supports LTE.

In a number of respects, handover procedures in accordance with embodiments of the disclosure as described herein may broadly correspond with conventional handover procedures, for example of the kind represented in FIG. 5. Thus it will be appreciated that various aspects of handover procedures which are not described in detail herein may be implemented in accordance with any conventional techniques. For example, the mechanism for determining whether or not a terminal device is to be handed over may be based on conventional techniques (e.g. radio channel measurement reporting/load balancing techniques), and the specific protocols used for communicating information between the various entities operating in the network may be based on conventional techniques.

In accordance with certain embodiments of the disclosure, handover procedures of the kind represented in FIG. 5 may be modified to help support handover between a source base station that supports both LTE and NR and a target base station supporting only LTE for a terminal device that supports both LTE and NR communications. The steps of the processing represented in FIG. 5 which are modified in accordance with some embodiments of the disclosure include the handover request signalling conveyed from the source base station to the target base station (labelled "4. Handover Request" in the FIG. 5), the handover request acknowledgement signalling conveyed from the target base station to the source base station (labelled "6. Handover Request Ack" in FIG. 5), and the RRC connection reconfiguration signalling conveyed from the source base station to the terminal device (labelled "7. RRC Conn. Reconf. incl. mobilityControlinformation").

Further information regarding these messages in an LTE context can be found in the relevant standards, e.g. the handover request acknowledgement signalling (labelled "6. Handover Request Ack" in FIG. 5) is discussed in ETSI TS 136 331 V13.0.0 (2016-01)/3GPP TS 36.331 version 13.0.0 Release 13 [4] and also ETSI TS 136 423 V13.2.0 (2016-01)/3GPP TS 36.423 version 13.2.0 Release 13 [5]. In LTE the Handover Request Ack includes an RRC E-UTRA Handover Command message as defined in subclause 10.2.2 in ETSI TS 136 331 V13.0.0 (2016-01)/3GPP TS 36.331 version 13.0.0 Release 13 [4], which states the Handover Command message is used to transfer the handover command generated by the target eNB and contains the entire DL-DCCH-Message including the RRCConnectionReconfiguration message used to perform handover within E-UTRAN or handover to E-UTRAN, generated (entirely) by the target eNB.

Thus to summarize some aspects of the LTE handover procedure and terminology and handover procedure, the following steps are involved—

The target eNB creates an RRC Reconfiguration message ("MSG_A") that includes the UE's configuration in the target cell.

It then takes this message and inserts it in a "handover command" information element (IE) within a "Handover Request Ack" message.

The target eNB then sends that "Handover Request Ack" message to the source eNB (over the X2 interface).

The source eNB looks for the "handover command" IE within the RRC container inside the "Handover Request Ack" message.

Source eNB extracts the "handover command" message and finds within it the RRC Reconfiguration message (MSG_A).

The source eNB then sends that RRC Reconfiguration message to the UE]:

As will be appreciated from the discussion herein, for approaches in accordance with certain embodiments of the disclosure mobility may be still based on RRC-LTE procedures, which may in some circumstances be considered advantageous because LTE may be expected to have ubiquitous coverage during initial deployment of NR networks.

Figure 6:
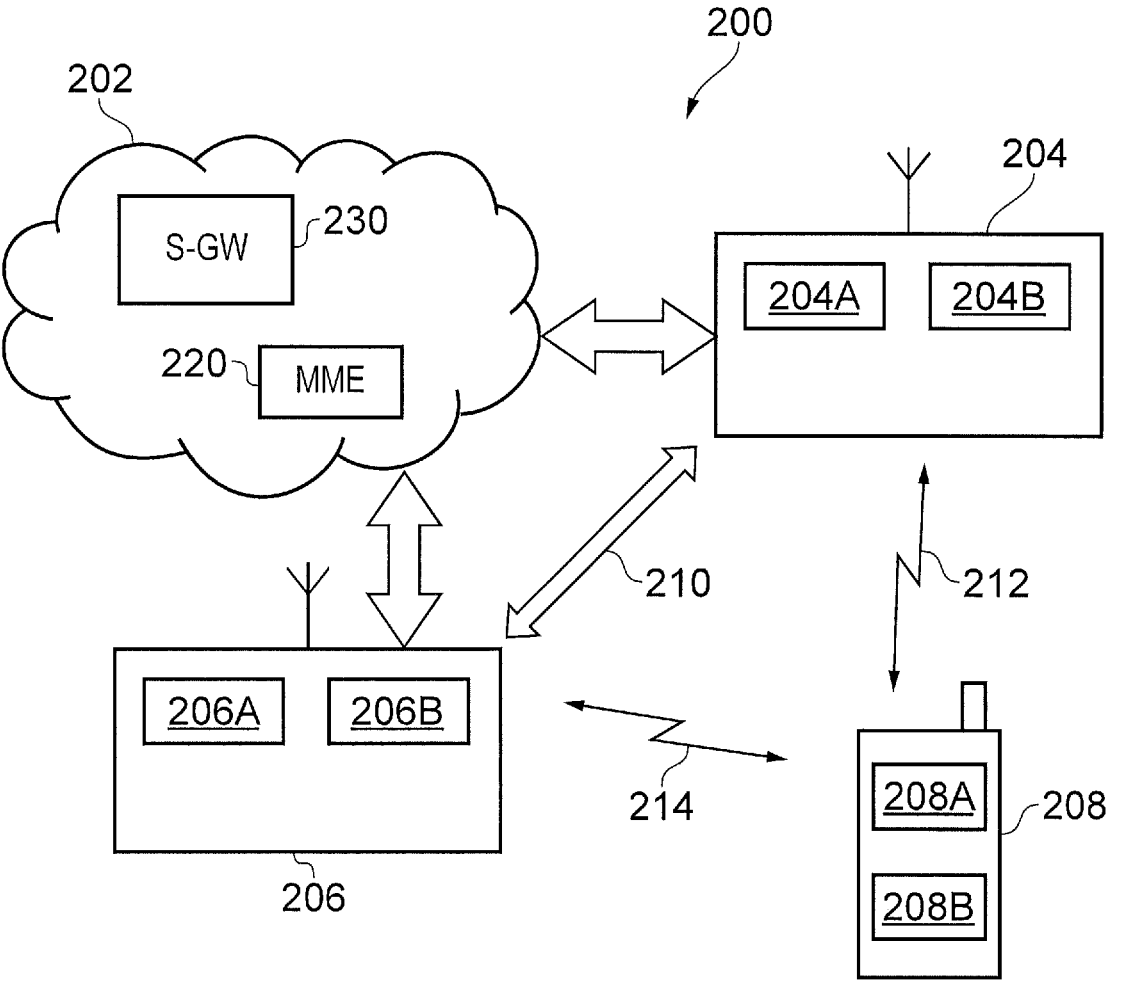
FIG. 6 schematically represents some aspects of a wireless telecommunication system in accordance with certain embodiments of the present disclosure.

FIG. 6 schematically represents some aspects of a wireless telecommunications system 200 configured to operate to support a handover of a terminal device 208 from a source radio network infrastructure element 204 to a target radio network infrastructure element 206 in accordance with certain embodiments of the disclosure. Aspects of the architecture and operation of the telecommunications system 200 which are not specifically described herein may be implemented in accordance with any known techniques. The radio network infrastructure elements 204, 208 may, for convenience, sometimes be referred to as base stations 204, 208, it being understood this term is used for simplicity and is not intended to imply the radio network infrastructure elements should conform to any specific network architecture, but on the contrary, they may correspond with any network infrastructure equipment that may be configured to provide functionality as described herein.

The telecommunications system 200 comprises a core network part (evolved packet core) 202 coupled to a radio network part. The radio network part comprises the source radio network infrastructure element 204, the target radio network infrastructure element 206, and the terminal device 208. In this example, two network infrastructure elements 204, 206 and one terminal device are shown for simplicity, but it will of course be appreciated that in practice the radio network part may comprise a larger number of base stations serving a larger number of terminal devices across various communication cells.

As with a conventional mobile radio network, the terminal device 208 is arranged to communicate data to and from the radio network infrastructure elements (base stations/transceiver stations) 204, 206. Typically the terminal device will only be connected to (i.e. able to exchange user plane data with) one network infrastructure element at a time, although it is also possible for a terminal device to receive certain types of data from multiple network infrastructure elements simultaneously. The radio network infrastructure elements are in turn communicatively connected to a serving gateway, S-GW, 230 in the core network part which is arranged to perform routing and management of mobile communications services to the terminal devices in the telecommunications system 200 via the radio network infrastructure elements 204, 206. In order to maintain mobility management and connectivity, the core network part 202 also includes a mobility management entity, MME, 220 which manages the enhanced packet service, EPS, connections with the terminal device 208 operating in the communications system based on subscriber information stored in a home subscriber server, HSS. Other network components in the core network in this example implementation (not shown for simplicity) include a policy charging and resource function, PCRF, and a packet data network gateway, PDN-GW, which provides a connection from the core network part 202 to an external packet data network, for example the Internet. As noted above, the operation of the various elements of the communications system 200 shown in FIG. 6 may be broadly conventional apart from where modified to provide functionality in accordance with embodiments of the present disclosure as discussed herein.

The source network infrastructure element 204 comprises transceiver circuitry 204a (which may also be referred to as a transceiver/transceiver unit) for transmission and reception of wireless signals and processor circuitry 204b (which may also be referred to as a processor/processor unit) configured to control the source network infrastructure element 204 to operate in accordance with embodiments of the present disclosure as described herein. The processor circuitry 204b may comprise various sub-units for providing functionality in accordance with embodiments of the present disclosure as explained further herein. These sub-units may be implemented as discrete hardware elements or as appropriately configured functions of the processor circuitry. Thus, the processor circuitry 204b may comprise circuitry which is suitably configured/programmed to provide the desired functionality described herein using conventional programming/configuration techniques for equipment in wireless telecommunications systems. The transceiver circuitry 204a and the processor circuitry 204b are schematically shown in FIG. 6 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). Furthermore, as noted above, it is assumed for the example scenario represented in FIG. 6 that the source network infrastructure element 204 supports both LTE and NR communications with the terminal device, and in this regard may in some cases comprise separate transceiver circuitry and processor circuitry for supporting each of these two radio access technologies. It will be appreciated the source network infrastructure element 204 will in general comprise various other elements associated with its operating functionality, such as a scheduler. For example, although not shown in FIG. 6 for simplicity, the processor circuitry 204b may comprise scheduling circuitry, that is to say the processor circuitry 204b may be configured/programmed to provide the scheduling function for the source network infrastructure element 204.

The target network infrastructure element 206 comprises transceiver circuitry 206a (which may also be referred to as a transceiver/transceiver unit) for transmission and reception of wireless signals and processor circuitry 206b (which may also be referred to as a processor/processor unit) configured to control the target network infrastructure element 206 to operate in accordance with embodiments of the present disclosure as described herein. The processor circuitry 206b may comprise various sub-units for providing functionality in accordance with embodiments of the present disclosure as explained further herein. These sub-units may be implemented as discrete hardware elements or as appropriately configured functions of the processor circuitry. Thus, the processor circuitry 206b may comprise circuitry which is suitably configured/programmed to provide the desired functionality described herein using conventional programming/configuration techniques for equipment in wireless telecommunications systems. The transceiver circuitry 206a and the processor circuitry 206b are schematically shown in FIG. 6 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). As noted above, it is assumed for the example scenario represented in FIG. 6 that the target network infrastructure element 206 supports only LTE communications with the terminal device. It will be appreciated the target network infrastructure element 206 will in general comprise various other elements associated with its operating functionality, such as a scheduler. For example, although not shown in FIG. 6 for simplicity, the processor circuitry 206b may comprise scheduling circuitry, that is to say the processor circuitry 206b may be configured/programmed to provide the scheduling function for the target network infrastructure element 206.

The terminal device 208 is adapted to support operations in accordance with embodiments of the present disclosure when communicating with the radio network infrastructure elements 204, 206, and in particular when being handed off between them, as discussed further herein. The terminal device 208 comprises transceiver circuitry 208a (which may also be referred to as a transceiver/transceiver unit) for transmission and reception of wireless signals and processor circuitry 208b (which may also be referred to as a processor/processor unit) configured to control the terminal device 208. The processor circuitry 208b may comprise various sub-units/sub-circuits for providing functionality in accordance with embodiments of the present disclosure as described herein. These sub-units may be implemented as discrete hardware elements or as appropriately configured functions of the processor circuitry. Thus the processor circuitry 208b may comprise circuitry which is suitably configured/programmed to provide the desired functionality described herein using conventional programming/configuration techniques for equipment in wireless telecommunications systems. The transceiver circuitry 208a and the processor circuitry 208b are schematically shown in FIG. 6 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). It will be appreciated the terminal device 208 will in general comprise various other elements associated with its operating functionality, for example a power source, user interface, and so forth, but these are not shown in FIG. 6 in the interests of simplicity. As noted above, it is assumed for the example scenario represented in FIG. 6 the terminal device is able to support both LTE and NR communications.

Thus for the example implementation scenario represented in FIG. 6 it is assumed the terminal device 208 is initially communicating with the source network infrastructure element 204 using both LTE and NR (i.e. having an LTE radio resource configuration and an NR radio resource configuration with respect to the source radio network infrastructure element) over a radio path 212. It is further assumed a situation arises in which the terminal device 208 is to be handed over from the source radio network infrastructure element 204 to the target radio network infrastructure elements 206, for example due to mobility. Furthermore still, it is assumed the target network infrastructure element 206 is only able to communicate with the terminal device 208 using LTE (i.e. with the terminal device only having an LTE radio resource configuration with respect to the target radio network infrastructure element) over a radio path 214.

The proposed coexistence schemes of using MBSFN subframes in the LTE spectrum for NR transmissions (as represented in FIG. 3) or providing NR as a component carrier of LTE (as represented in FIG. 4) are both able to interwork with the legacy EPC (with or without improvement modifications), and do not require the deployment of a new core network (standardised as part of 5G NR NG-CN). Nonetheless, it will be appreciated embodiments of the disclosure may also be implemented in scenarios with a new core network deployment.

Figure 7:
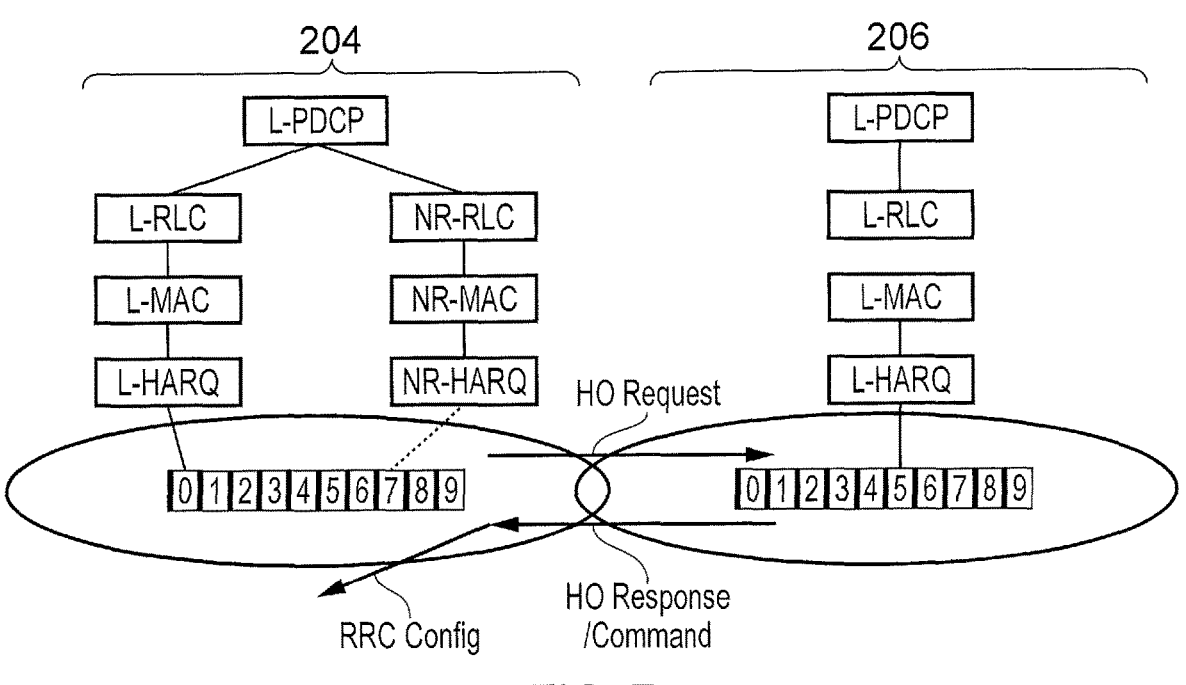
FIG. 7 schematically represents some aspects of a handover from a source network infrastructure element supporting LTE and NR connectivity (i.e. dual connectivity) and a target network infrastructure element supporting only LTE connectivity.

FIG. 7 is a diagram schematically representing some aspects of the source radio network infrastructure element 204 and the target radio network infrastructure element 206, including some aspects of their respective protocol stacks, and also some aspects of the signalling associated with a handover procedure in accordance with certain embodiments of the disclosure. As schematically represented in FIG. 7, it is assumed LTE and NR coexist in the wireless telecommunications system comprising the source and target radio network infrastructure element on the basis of a time division approach of the kind represented in FIG. 3.

Thus, and as shown in FIG. 7, in one example deployment for the infrastructure element 204 that supports both LTE and NR (i.e. dual connectivity), a single PDCP layer may receive packets in the downlink from the S-GW 230 and pass them on to the RLC layer(s). While it is possible the RLC and MAC layers from LTE may be (re)used for NR, this could potentially reduce some of the benefits that could be introduced due to enhancements for NR in layer 2 (where layer 2 comprises one or more of PDCP, RLC, MAC and/or HARQ entities). For example, it has already been suggested that a NR-RLC layer may not support concatenation, and as a result, data for transmission on uplink for an NR terminal device may be prepared more quickly compared to LTE-layer 2. It may in some cases be preferable for the benefits of NR layer 2 enhancement to be realised in a deployment where LTE and NR share the same spectrum in order to distinguish NR performance compared to LTE.

So, in principle, a dual connectivity architecture can be reused on the same frequency as schematically shown for the network infrastructure equipment 204 supporting dual connectivity towards the left-hand side of FIG. 7, whereby independent RLC, MAC and HARQ entities may be used for LTE and NR for the same radio bearer. The rationale for using such a split for a single radio bearer will be that LTE-PDCP and eventually LTE based security mechanisms interacting with LTE-EPC can be re-used. It will also relax the requirement for LTE-NR coexistence if the terminal device supports NR security mechanisms as well, although this is not necessary. As also schematically shown in FIG. 7, the target network infrastructure element 206 comprises single PDCP, RLC, MAC and HARQ entities supporting LTE.

FIG. 7 also schematically indicates with labelled arrows some aspect of handover signalling in accordance with embodiments of the disclosure, including a handover request message ("HO Request") communicated from the source radio network infrastructure element to the target radio network infrastructure element, a handover response/command message ("HO Response/Command") communicated from the target radio network infrastructure element to the source radio network infrastructure element, and an RRC configuration message ("RRC config.") communicated from the source radio network infrastructure element to the terminal device (not shown in FIG. 7).

Thus, the configurations for the network infrastructure elements (radio cells) for this example approach may be summarised as follows.

The source radio network infrastructure element (source cell) configuration comprises a single PDCP entity (single radio bearer using LTE security), a different RLC entity per radio access technology, which in this example gives two entities for a single radio bearer, a different MAC entity per radio access technology, and also a separate HARQ entity per radio access technology (HARQ transmission and retransmission takes place on the same entity).

The target radio network infrastructure element (target cell) configuration comprises conventional LTE entities for Layer 2 (L2) and the physical layer (PHY).

Thus for the example architecture represented in FIG. 7, the terminal device is configured with an LTE and NR configuration in the source cell (i.e. when initially communicating with the source radio network infrastructure element 204) and a single bearer is split between LTE and NR, but the target cell (supported by the target radio network structure and 206) is a conventional LTE cell and so the split bearer in the terminal device should be moved to use LTE protocols when there is a handover from the source radio network infrastructure element to the target radio network infrastructure element. Another scenario is where a bearer using NR L2 and PHY in the source cell (no split bearer being assumed) is moved to another cell using an LTE L2 and PHY.

So in one of the embodiments, a handover request, from a serving cell utilizing LTE and NR resources for a UE, is sent to a target base station where the handover request message includes the UE configuration of LTE and NR. The configuration includes NR RLC-Config, NR MAC-config and NR Phy-config in addition to conventional LTE configuration. It may also include neighbouring NR cell measurement configuration and measurement results in addition to conventional LTE measurement configuration and results. The target base station may configure an LTE+NR configuration in the handover command message. If the target base station or cell does not understand the NR configuration as it has not been upgraded then the target base station includes the full LTE configuration information in the handover command message. The UE does not assume a delta configuration (where in a delta configuration any configuration from the source cell is deemed to be valid if not indicated by the target cell) in this case and applies the configuration as indicated in the RRC Reconfig message.

It may be expected that for handover between radio network infrastructure elements that both support LTE and NR, a delta configuration approach may be adopted for providing the terminal device with the configuration information in much the same as currently used for hand over between two LTE base stations. That is to say, the target cell may provide the source cell with an indication of a change in configuration compared to the source cell for forwarding to a terminal device being handed over. However, the inventors have recognised this delta approach can give rise to difficulties for a scenario in which the source radio network infrastructure element supports connectivity on two (or indeed more) RATs where one of these RATs is not supported by the target radio network infrastructure element. Certain embodiments of the disclosure can help address this issue.

Figure 8:
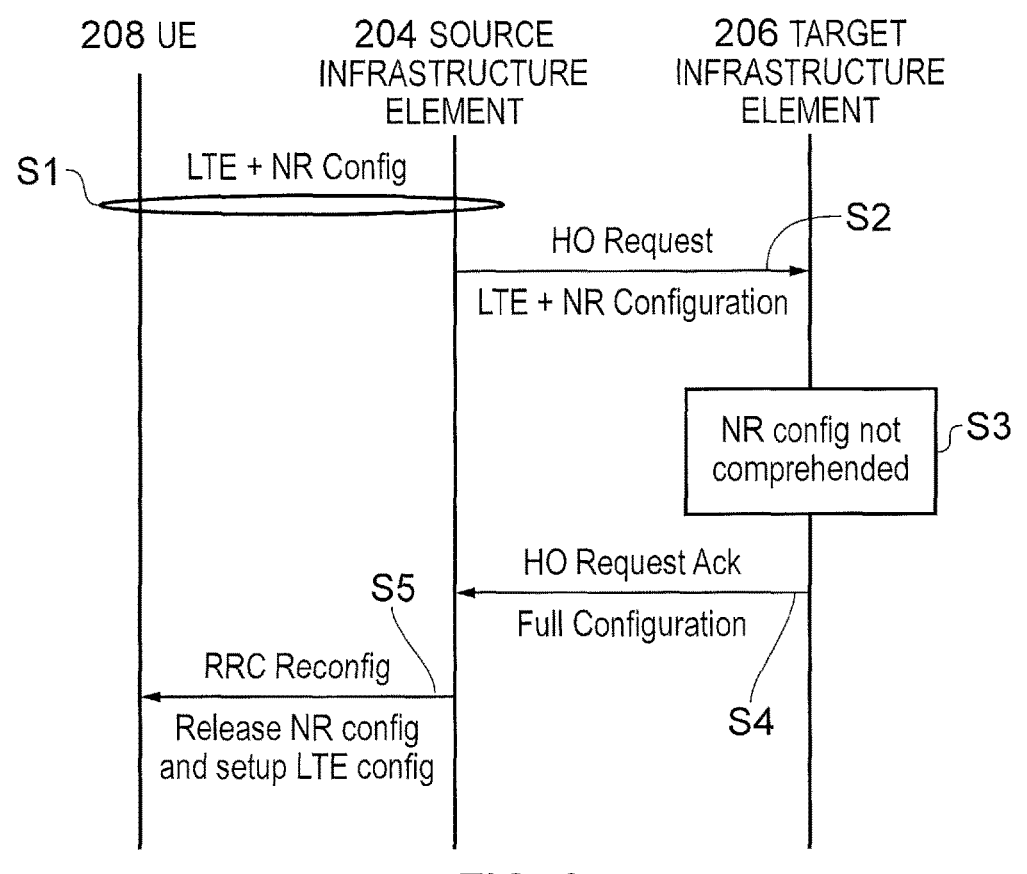
FIGS. 8 and 9 are signalling ladder diagrams schematically representing some aspects of handover procedures in accordance with certain embodiments of the present disclosure.

FIG. 8 is a ladder diagram schematically representing some aspects of signalling exchange between the terminal device 208, the source radio network infrastructure element (source/serving cell) 204 and the target radio network infrastructure element (target cell) 206 of FIG. 6 in accordance with certain embodiments of the disclosure.

In step S1 the terminal device is assumed to be communicating with the source radio network infrastructure element over the radio path 212. That is to say, the terminal device has an LTE and NR configuration with respect to the source infrastructure element 204.

In step S2, in response to the source radio network infrastructure element 204 determining the terminal device should be handed over to the target radio network infrastructure element 204, the source radio network infrastructure element 204 conveys a handover request to the target radio network infrastructure element. The reason why the source radio network infrastructure element determines the terminal device should be handed over is not significant to the principles described herein, and may, for example, be determined in accordance with conventional procedures for triggering handovers in wireless telecommunications systems.

The handover request message of step S2 may be communicated broadly in accordance with the established principles of communicating a handover request message in an LTE network (e.g. in terms of the signalling protocols used), but the handover request message of step S2 differs from a conventional LTE network handover request message in including an indication of the terminal device's NR configuration as well as its LTE configuration with respect to the source network infrastructure element 204. Furthermore, whereas the signalling exchange between infrastructure elements is schematically represented in the figures herein as being directly between the radio network infrastructure elements, e.g. over an X2 type interface, it will be appreciated for other system architectures, for example architectures having no direct connection between the source and target radio network infrastructure elements, message exchange between the radio network elements may equally occur via the core network.

In step S3, the target network infrastructure element assesses the handover request received from the source network infrastructure element in step S2 and determines that the part of the message relating to the terminal devices NR configuration is not comprehended/not relevant to the target infrastructure element. This is because, as discussed above, the target infrastructure element in this example is assumed not to support NR communications.

In response to determining that there is an aspect of the terminal device's configuration which relates to a radio access technology which the target infrastructure element does not support, the target infrastructure element concludes it should send the source infrastructure element a full LTE configuration for the terminal device (i.e. not just a delta configuration) in respect of the manner in which the target infrastructure element can support the terminal device.

Thus, in step S4, the target network infrastructure element transmits a handover request acknowledgement message (handover command) to the source infrastructure element which comprises a full configuration for the radio access technology (or technologies) the target network infrastructure element does support for the terminal device, which in this specific example comprises a full LTE configuration.

The handover request acknowledgement message of step S4 may be communicated broadly in accordance with the established principles of communicating a handover request acknowledgement message in an LTE network (e.g. in terms of the signalling protocols used), but the handover request acknowledgement message of step S4 differs from a conventional LTE network handover request acknowledgement message in including an indication of a full configuration for the terminal device for one, but not both, of the radio access technologies associated with the configuration information indicated in the handover request message of step S2.

In step S5, the source network infrastructure element 204, on receiving the handover request acknowledgement message from the target network infrastructure element 206, proceeds to transmit an RRC reconfiguration message to the terminal device 208 based on the configuration information received from the target infrastructure element, thereby causing the terminal device 280 to release its configuration and set up an LTE configuration based on the full configuration information received by the source infrastructure element from the target infrastructure element in step S4.

The RRC reconfiguration message of step S5 may be communicated broadly in accordance with the established principles of communicating an RRC reconfiguration message in an LTE network (e.g. in terms of the signalling protocols used).

Once the terminal device 208 has received the RRC reconfiguration message in step S5 and the relevant LTE reconfiguration has been applied and the NR configuration released, the terminal device are 208 detaches from the source network infrastructure element and synchronises to the target network infrastructure element. This, and further steps of the handover procedure, may be performed in accordance with conventional techniques, for example with reference to the procedure set out in FIG. 5.

Thus, in accordance with the procedure set out in FIG. 8, a terminal device may be handed over from a source network infrastructure element which supports communications with the terminal device on a radio access technology which is not supported by the target radio network infrastructure element.

Figure 9:
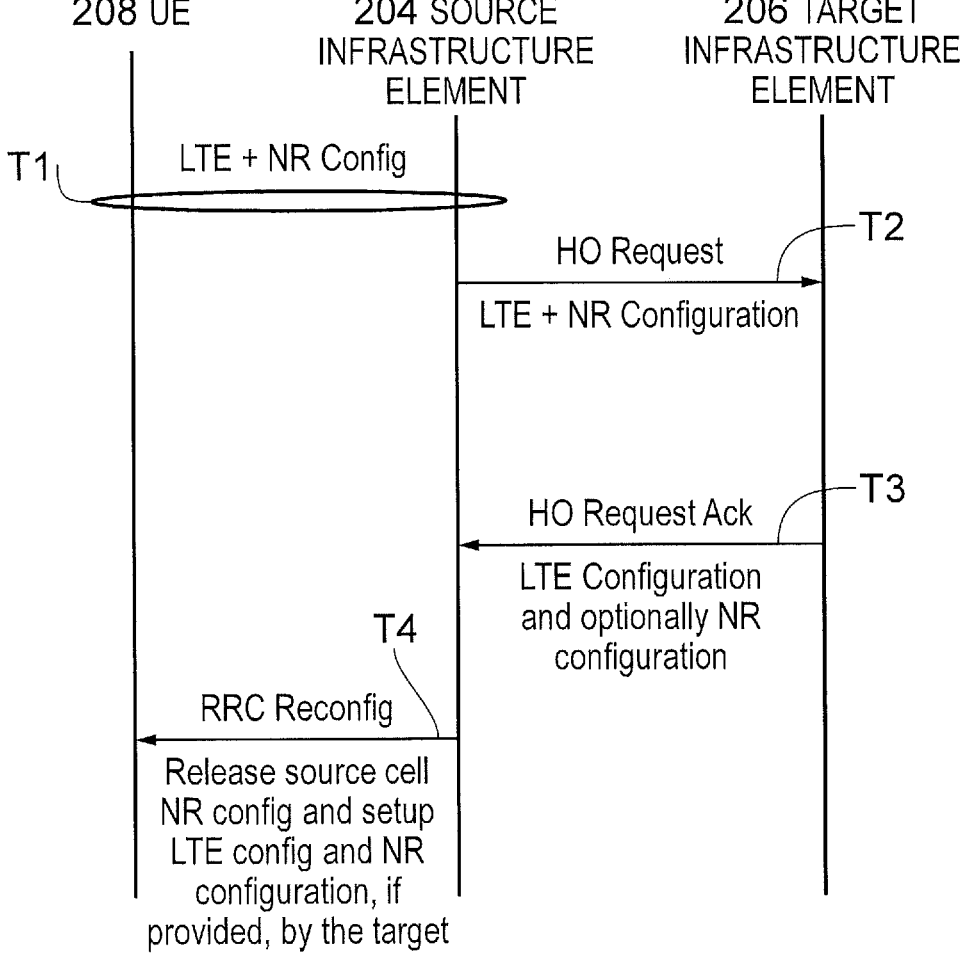

FIG. 9 is a ladder diagram which is in some respects similar to, and will be understood from, FIG. 8, but schematically represents some aspects of signalling exchange between the terminal device 208, the source radio network infrastructure element (source/serving cell) 204 and the target radio network infrastructure element (target cell) 206 of FIG. 6 in accordance with certain other embodiments of the disclosure. For the example implementation scenario represented in FIG. 9, it is again assumed the terminal device is being handed over from the source network infrastructure element 204 to the target network infrastructure element 206. It is further assumed again the terminal device and the source radio network infrastructure element support LTE and NR communications. However, unlike the specific example scenario discussed above with relation to FIG. 8, FIG. 9 represents a generalised approach in which the target network infrastructure element might or might not support NR communications. (It will be appreciated the general principles of the approach of FIG. 8 may also be used when the target cell does support NR, and similarly the general principles of the approach of FIG. 9 may be used when the target cell does not support NR).

To briefly summarise the alternative approach of FIG. 9, a terminal device's NR configuration is released at the time of handover (at step T4 in FIG. 9). This may be done by sending a HO command message (RRC reconfiguration message) to the terminal device (step T4 in FIG. 9) which has either an explicit or implicit indication for the terminal device to release the NR configuration. The terminal device may the take the target cell configuration into account which is included in the HO Command message, which may or may not include an NR configuration depending on the target cell's deployment capability (i.e. whether or not it supports NR) and a determination on whether or not to support NR communications for this particular terminal device (e.g. based on levels of congestion etc.). Both these steps can be achieved in a single message or separate messages (in some cases a single message approach may be preferred to save signalling). The serving cell configuration of NR can still be sent to the target base station in the HO Request message of step T2 in FIG. 6 below. One potential advantage of the example approach represented in FIG. 9 for some example implementations is an increased degree of isolation can be maintained between source and target configurations relating to NR configuration (i.e. reduced chance of the source cell NR configuration spilling over to the target cell in terms of data forwarding).

Thus in step T1 the terminal device 208 is assumed to be communicating with the source radio network infrastructure 204 element over the radio path 212. That is to say, the terminal device has an LTE and NR configuration with respect to the source infrastructure element 204.

In step T2, in response to the source radio network infrastructure element 204 determining the terminal device should be handed over to the target radio network infrastructure element 204, the source radio network infrastructure element 204 conveys a handover request to the target radio network infrastructure element. The reason why the source radio network infrastructure element determines the terminal device should be handed over is not significant to the principles described herein, and may, for example, be determined in accordance with conventional procedures for triggering handovers in wireless telecommunications systems.

As for step S2 in FIG. 8, the handover request message of step T2 in FIG. 9 may be communicated broadly in accordance with the established principles of communicating a handover request message in an LTE network (e.g. in terms of the signalling protocols used), but the handover request message of step T2 differs from a conventional LTE network handover request message in including an indication of the terminal device's NR configuration as well as its LTE configuration with respect to the source network infrastructure element 204.

In step T3, in response to receiving and processing the handover request message of step T2, the target network infrastructure element transmits a handover request acknowledgement message to the source infrastructure element which comprises a configuration (which may be a full configuration or a delta configuration) for the radio access technology (or technologies) the target network infrastructure element supports, which in this specific example thus comprises an LTE configuration and potentially/optionally an NR configuration.

In step T4, the source network infrastructure element 204, on receiving the handover request acknowledgement message from the target network infrastructure element 206, proceeds to transmit an RRC reconfiguration message/HO command message to the terminal device 208 based on the configuration information received from the target infrastructure element and causes the terminal device to release its existing NR configuration as discussed above.

In case both source and target cells support both LTE and NR configuration, some parts of the complete NR L2 protocol stack may not need not need to be reset (instead maintained) as part of handover signalling to the UE (e.g. as specified by 3GPP in "UE actions upon receiving RRC Reconfiguration message with mobility control info" section 5.3.5.4 of ETSI TS 136 331 V13.0.0 (2016-01)/3GPP TS 36.331 version 13.0.0 Release 13 [4]). The LTE handover procedure involves a reset of layer 2 protocol stack as mentioned in the above referenced section of ETSI TS 136 331 V13.0.0 (2016-01)/3GPP TS 36.331 version 13.0.0 Release 13 [4]. (LTE handover will shift the protocol location between cells on the network side and synchronisation between the old and new state of the protocol entity may not be possible in the UE, hence reset). However, due to different split options between CU (Central unit which may house NR-PDCP layer and/or NR-RLC layer) and DU (distributed unit which may house NR-RLC and/or NR-MAC layer) on the network side in NR, some functionality can be maintained. If e.g. the same DU entity controls the NR resources in source and target LTE cells then there is no need to reset protocol layers residing in the DU entity.

If the source cell supports LTE and the target cell supports LTE+NR then the RRC Reconfiguration message may include the LTE+NR configuration Thus, in accordance with the procedure set out in FIG. 9, a terminal device may be handed over from a source network infrastructure elements which supports communications with the terminal device on a radio access technology which may or may not be supported by the target radio network infrastructure element.

It will be appreciated the above described approaches may, in some cases, introduce additional delays in continuing a session on the target network infrastructure equipment. If this is considered a concern, previously proposed techniques, such as "make before break" (in which a terminal device may be simultaneously connected to both source and target cell for a period of time) may be used.

Thus there has been described a method for handing over a terminal device from a source network infrastructure element to a target network infrastructure element in a wireless telecommunications system supporting communications in accordance with a first radio access technology and a second, different, radio access technology (which may be operating on the same frequency), wherein the source network infrastructure element is operable to communicate with the terminal device in accordance with the first radio access technology and the second radio access technology using a split radio bearer supported by a layer 2 protocol stack for communications in accordance with the first radio access technology and a second layer 2 protocol stack for communications in accordance with the second radio access technology. The respective protocol stacks may comprise corresponding entities such as one or more of a RLC entity, a MAC entity and a HARQ entity.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A method for handing over a terminal device from a source network infrastructure element to a target network infrastructure element in a wireless telecommunications system supporting communications in accordance with a first radio access technology and a second, different, radio access technology, wherein the target network infrastructure element is operable to communicate with the terminal device in accordance with the first radio access technology and the source network infrastructure element is operable to communicate with the terminal device in accordance with the first radio access technology and the second radio access technology, and wherein the method comprises: establishing, at the source network infrastructure element, that the terminal device should be handed over from the source network infrastructure element to the target network infrastructure element; transmitting, from the source network infrastructure element to the target network infrastructure element, a handover request message comprising an indication of a source radio resource configuration for communications between the source network infrastructure element and the terminal device in accordance with the first radio access technology and the second radio access technology; receiving, at the source network infrastructure element from the target network infrastructure element, a handover request acknowledgement message comprising an indication of a target radio resource configuration for communications between the target network infrastructure element and the terminal device in accordance with the first radio access technology; and transmitting, from the source network infrastructure element to the terminal device, an indication of the target radio resource configuration, wherein the source network infrastructure element is operable to communicate with the terminal device using a radio bearer supported by a first layer-2 protocol stack for communications in accordance with the first radio access technology and a second layer 2-protocol stack for communications in accordance with the second radio access technology.

Paragraph 2. The method of paragraph 1, further comprising the target network infrastructure element determining if it will be operable to communicate with the terminal device in accordance with the second radio access technology following the handover, and wherein the indication of the target radio resource configuration comprises a full radio resource configuration for communications between the target network infrastructure element and the terminal device if the target network infrastructure element determines it will not be operable to communicate with the terminal device in accordance with the second radio access technology following the handover.

Paragraph 3. The method of paragraph 1, further comprising the target network infrastructure element determining if it will be operable to communicate with the terminal device in accordance with the second radio access technology following the handover, and wherein the indication of the target radio resource configuration comprises an indication of differences between the source radio resource configuration and the target radio resource configuration if the target network infrastructure element determines it will be operable to communicate with the terminal device in accordance with the second radio access technology following the handover.

Paragraph 4. The method of any preceding paragraph, wherein the indication of the target radio resource configuration comprises an indication of differences between aspects of the source radio resource configuration relating to the first radio access technology and aspects of the target radio resource configuration relating to the first radio access technology.

Paragraph 5. The method of any preceding paragraph, further comprising the terminal device releasing the source radio resource configuration for communications between the source network infrastructure element and the terminal device in accordance with the second radio access technology in response to receiving an indication from the source network infrastructure element to indicate it should do so.

Paragraph 6. The method of paragraph 5, wherein the indication the terminal device should release the source radio resource configuration for communications between the source network infrastructure element and the terminal device in accordance with the second radio access technology is received by the terminal device from the source network infrastructure element in association with indication of the target radio resource configuration.

Paragraph 7. The method of any preceding paragraph, wherein the source network infrastructure element is operable to communicate with the terminal device in accordance with the first radio access technology and the second radio access technology in a time multiplexed manner.

Paragraph 8. The method of any preceding paragraph, wherein the source network infrastructure element is operable to communicate with the terminal device in accordance with the first radio access technology and the second radio access technology on different component carriers of an aggregated carrier.

Paragraph 9. A method of operating a source network infrastructure element in a procedure for handing over a terminal device from the source network infrastructure element to a target network infrastructure element in a wireless telecommunications system supporting communications in accordance with a first radio access technology and a second, different, radio access technology, wherein the target network infrastructure element is operable to communicate with the terminal device in accordance with the first radio access technology and the source network infrastructure element is operable to communicate with the terminal device in accordance with the first radio access technology and the second radio access technology, and wherein the method comprises: establishing that the terminal device should be handed over from the source network infrastructure element to the target network infrastructure element; transmitting to the target network infrastructure element a handover request message comprising an indication of a source radio resource configuration for communications between the source network infrastructure element and the terminal device in accordance with the first radio access technology and the second radio access technology; receiving from the target network infrastructure element a handover request acknowledgement message comprising an indication of a target radio resource configuration for communications between the target network infrastructure element and the terminal device in accordance with the first radio access technology; and transmitting to the terminal device, an indication of the target radio resource configuration, wherein the source network infrastructure element is operable to communicate with the terminal device using a radio bearer supported by a first layer-2 protocol stack for communications in accordance with the first radio access technology and a second layer-2 protocol stack for communications in accordance with the second radio access technology.

Paragraph 10. A source network infrastructure element for use in a procedure for handing over a terminal device from the source network infrastructure element to a target network infrastructure element in a wireless telecommunications system supporting communications in accordance with a first radio access technology and a second, different, radio access technology, wherein the target network infrastructure element is operable to communicate with the terminal device in accordance with the first radio access technology and the source network infrastructure element is operable to communicate with the terminal device in accordance with the first radio access technology and the second radio access technology, wherein the source network infrastructure element comprises controller circuitry and transceiver circuitry configured to operate together such that the source network infrastructure element is operable to: establish that the terminal device should be handed over from the source network infrastructure element to the target network infrastructure element; transmit to the target network infrastructure element a handover request message comprising an indication of a source radio resource configuration for communications between the source network infrastructure element and the terminal device in accordance with the first radio access technology and the second radio access technology; receive from the target network infrastructure element a handover request acknowledgement message comprising an indication of a target radio resource configuration for communications between the target network infrastructure element and the terminal device in accordance with the first radio access technology; and transmit to the terminal device, an indication of the target radio resource configuration, wherein the source network infrastructure element is operable to communicate with the terminal device using a radio bearer supported by a first layer-2 protocol stack for communications in accordance with the first radio access technology and a second layer-2 protocol stack for communications in accordance with the second radio access technology.

Paragraph 11. Circuitry for a source network infrastructure element for use in a procedure for handing over a terminal device from the source network infrastructure element to a target network infrastructure element in a wireless telecommunications system supporting communications in accordance with a first radio access technology and a second, different, radio access technology, wherein the target network infrastructure element is operable to communicate with the terminal device in accordance with the first radio access technology and the source network infrastructure element is operable to communicate with the terminal device in accordance with the first radio access technology and the second radio access technology, wherein the circuitry comprises controller circuitry and transceiver circuitry configured to operate together such that the circuitry is operable to: establish that the terminal device should be handed over from the source network infrastructure element to the target network infrastructure element; transmit to the target network infrastructure element a handover request message comprising an indication of a source radio resource configuration for communications between the source network infrastructure element and the terminal device in accordance with the first radio access technology and the second radio access technology; receive from the target network infrastructure element a handover request acknowledgement message comprising an indication of a target radio resource configuration for communications between the target network infrastructure element and the terminal device in accordance with the first radio access technology; and transmit to the terminal device, an indication of the target radio resource configuration, wherein the source network infrastructure element is operable to communicate with the terminal device using a radio bearer supported by a first layer-2 protocol stack for communications in accordance with the first radio access technology and a second layer-2 protocol stack for communications in accordance with the second radio access technology.

Paragraph 12. A method of operating a terminal device in a procedure for handing over the terminal device from a source network infrastructure element to a target network infrastructure element in a wireless telecommunications system supporting communications in accordance with a first radio access technology and a second, different, radio access technology, wherein the target network infrastructure element is operable to communicate with the terminal device in accordance with the first radio access technology and the source network infrastructure element is operable to communicate with the terminal device in accordance with the first radio access technology and the second radio access technology, and wherein the method comprises: establishing the terminal device is to be handed over from source network infrastructure element to the target network infrastructure and receiving from the source network infrastructure element an indication of a target radio resource configuration for communications between the target network infrastructure element and the terminal device in accordance with the first radio access technology; wherein the terminal device is operable to communicate with at least one of the source network infrastructure element and the target network infrastructure element using a radio bearer supported by a first layer-2 protocol stack for communications in accordance with the first radio access technology and a second layer-2 protocol stack for communications in accordance with the second radio access technology.

Paragraph 13. A terminal device for use in a procedure for handing over the terminal device from a source network infrastructure element to a target network infrastructure element in a wireless telecommunications system supporting communications in accordance with a first radio access technology and a second, different, radio access technology, wherein the target network infrastructure element is operable to communicate with the terminal device in accordance with the first radio access technology and the source network infrastructure element is operable to communicate with the terminal device in accordance with the first radio access technology and the second radio access technology, wherein the terminal devoice comprises controller circuitry and transceiver circuitry configured to operate together such that the terminal device is operable to: establish the terminal device is to be handed over from source network infrastructure element to the target network infrastructure and receive from the source network infrastructure element an indication of a target radio resource configuration for communications between the target network infrastructure element and the terminal device in accordance with the first radio access technology; wherein the terminal device is operable to communicate with the at least one of the source network infrastructure element and the target network infrastructure element using a radio bearer supported by a first layer-2 protocol stack for communications in accordance with the first radio access technology and a second layer-2 protocol stack for communications in accordance with the second radio access technology.

Paragraph 14. Circuitry for a terminal device for use in a procedure for handing over the terminal device from a source network infrastructure element to a target network infrastructure element in a wireless telecommunications system supporting communications in accordance with a first radio access technology and a second, different, radio access technology, wherein the target network infrastructure element is operable to communicate with the terminal device in accordance with the first radio access technology and the source network infrastructure element is operable to communicate with the terminal device in accordance with the first radio access technology and the second radio access technology, wherein the circuitry comprises controller circuitry and transceiver circuitry configured to operate together such that the circuitry is operable to: establish the terminal device is to be handed over from source network infrastructure element to the target network infrastructure and receive from the source network infrastructure element an indication of a target radio resource configuration for communications between the target network infrastructure element and the terminal device in accordance with the first radio access technology; wherein the terminal device is operable to communicate with at least one of the source network infrastructure element and the target network infrastructure element using a radio bearer supported by a first layer-2 protocol stack for communications in accordance with the first radio access technology and a second layer-2 protocol stack for communications in accordance with the second radio access technology.

Paragraph 15. A method for handing over a terminal device from a source network infrastructure element to a target network infrastructure element in a wireless telecommunications system supporting communications in accordance with a first radio access technology and a second, different, radio access technology, wherein the source network infrastructure element is operable to communicate with the terminal device in accordance with the first radio access technology and the target network infrastructure element is operable to communicate with the terminal device in accordance with the first radio access technology and the second radio access technology, and wherein the method comprises: establishing, at the source network infrastructure element, that the terminal device should be handed over from the source network infrastructure element to the target network infrastructure element; transmitting, from the source network infrastructure element to the target network infrastructure element, a handover request message comprising an indication of a source radio resource configuration for communications between the source network infrastructure element and the terminal device in accordance with the first radio access technology; receiving, at the source network infrastructure element from the target network infrastructure element, a handover request acknowledgement message comprising an indication of a target radio resource configuration for communications between the target network infrastructure element and the terminal device in accordance with the first radio access technology and the second radio access technology; and transmitting, from the source network infrastructure element to the terminal device, an indication of the target radio resource configuration, wherein the target network infrastructure element is operable to communicate with the terminal device using a radio bearer supported by a first layer-2 protocol stack for communications in accordance with the first radio access technology and a second layer 2-protocol stack for communications in accordance with the second radio access technology.

Paragraph 16. A method of operating a target network infrastructure element in a procedure for handing over a terminal device from a source network infrastructure element to the target network infrastructure element in a wireless telecommunications system supporting communications in accordance with a first radio access technology and a second, different, radio access technology, wherein the source network infrastructure element is operable to communicate with the terminal device in accordance with the first radio access technology and the target network infrastructure element is operable to communicate with the terminal device in accordance with the first radio access technology and the second radio access technology, and wherein the method comprises: receiving from the source network infrastructure element a handover request message comprising an indication of a source radio resource configuration for communications between the source network infrastructure element and the terminal device in accordance with the first radio access technology; and transmitting to the source network infrastructure element a handover request acknowledgement message comprising an indication of a target radio resource configuration for communications between the target network infrastructure element and the terminal device in accordance with the first radio access technology and the second radio access technology; wherein the target network infrastructure element is operable to communicate with the terminal device using a radio bearer supported by a first layer-2 protocol stack for communications in accordance with the first radio access technology and a second layer-2 protocol stack for communications in accordance with the second radio access technology.

Paragraph 17. The method of paragraph 16, wherein the indication of a target radio resource configuration for communications between the target network infrastructure element and the terminal device comprises an indication of a change in radio resource configuration from the source radio resource configuration to the target in radio resource configuration that applies to only some, and not all, layers in the second layer 2-protocol stack.

Paragraph 18. A target network infrastructure element for use in a procedure for handing over a terminal device from a source network infrastructure element to the target network infrastructure element in a wireless telecommunications system supporting communications in accordance with a first radio access technology and a second, different, radio access technology, wherein the source network infrastructure element is operable to communicate with the terminal device in accordance with the first radio access technology and the target network infrastructure element is operable to communicate with the terminal device in accordance with the first radio access technology and the second radio access technology, wherein the target network infrastructure element comprises controller circuitry and transceiver circuitry configured to operate together such that the target network infrastructure element is operable to: receive from the source network infrastructure element a handover request message comprising an indication of a source radio resource configuration for communications between the source network infrastructure element and the terminal device in accordance with the first radio access technology; and transmit to the source network infrastructure element a handover request acknowledgement message comprising an indication of a target radio resource configuration for communications between the target network infrastructure element and the terminal device in accordance with the first radio access technology and the second radio access technology; wherein the target network infrastructure element is operable to communicate with the terminal device using a radio bearer supported by a first layer-2 protocol stack for communications in accordance with the first radio access technology and a second layer-2 protocol stack for communications in accordance with the second radio access technology.

Paragraph 19. Circuitry for a target network infrastructure element for use in a procedure for handing over a terminal device from a source network infrastructure element to the target network infrastructure element in a wireless telecommunications system supporting communications in accordance with a first radio access technology and a second, different, radio access technology, wherein the source network infrastructure element is operable to communicate with the terminal device in accordance with the first radio access technology and the target network infrastructure element is operable to communicate with the terminal device in accordance with the first radio access technology and the second radio access technology, wherein the circuitry comprises controller circuitry and transceiver circuitry configured to operate together such that the circuitry is operable to: receive from the source network infrastructure element a handover request message comprising an indication of a source radio resource configuration for communications between the source network infrastructure element and the terminal device in accordance with the first radio access technology; and transmit to the source network infrastructure element a handover request acknowledgement message comprising an indication of a target radio resource configuration for communications between the target network infrastructure element and the terminal device in accordance with the first radio access technology and the second radio access technology; wherein the target network infrastructure element is operable to communicate with the terminal device using a radio bearer supported by a first layer-2 protocol stack for communications in accordance with the first radio access technology and a second layer-2 protocol stack for communications in accordance with the second radio access technology.

REFERENCES

[1] 3GPP document RP-160671, "New SID Proposal: Study on New Radio Access Technology," NTT DOCOMO, RAN #71, Gothenburg, Sweden, 7 to 10. March, 2016
[2] Holma H. and Toskala A, "LTE for UMTS OFDMA and SC-FDMA based radio access", John Wiley and Sons, 2009
[3] ETSI TS 136 300 V13.2.0 (2016-01)/3GPP TS 36.300 version 13.2.0 Release 13
[4] ETSI TS 136 331 V13.0.0 (2016-01)/3GPP TS 36.331 version 13.0.0 Release 13
[5] ETSI TS 136 423 V13.2.0 (2016-01)/3GPP TS 36.423 version 13.2.0 Release 13

What is claimed is:

1. A method for handing over a terminal device in a wireless telecommunications system, the method comprising:

establishing, at a source network infrastructure equipment of the wireless telecommunications system, that the terminal device should be handed over from the source network infrastructure equipment to a target network infrastructure equipment in the wireless telecommunications system, wherein the source network infrastructure equipment is operable to communicate with the terminal device in accordance with a first radio access technology and a second radio access technology different from the first radio access technology, and the target network infrastructure equipment is operable to communicate with the terminal device in accordance with the first radio access technology and is not operable to communicate with the terminal device in accordance with the second radio access technology;

transmitting, from the source network infrastructure equipment to the target network infrastructure equipment, a handover request message comprising an indication of a source radio resource configuration for communications between the source network infrastructure equipment and the terminal device, wherein the source radio resource configuration includes a first configuration of the first radio access technology for the terminal device with respect to the source network infrastructure equipment and a second configuration of the second radio access technology for the terminal device with respect to the source network infrastructure equipment;

receiving, at the source network infrastructure equipment from the target network infrastructure equipment, a handover request acknowledgement message comprising an indication of a target radio resource configuration for communications between the target network infrastructure equipment and the terminal device in accordance with only the first radio access technology; and transmitting, from the source network infrastructure equipment to the terminal device and in response to reception of the handover request acknowledge message, a radio resource configuration command message including the indication of the target radio resource configuration and an indication to release an entirety of the second configuration of the second radio access technology, wherein the source network infrastructure equipment is operable to communicate with the terminal device using a radio bearer supported by a first layer 2-protocol stack for communications in accordance with the first radio access technology and a second layer 2-protocol stack for communications in accordance with the second radio access technology, the first radio access technology is long term evolution (LTE) technology and the first configuration is an LTE configuration, and the second radio access technology is new radio (NR) technology and the second configuration is an NR configuration.

2. The method of claim 1, further comprising:

determining, at the target network infrastructure equipment, whether communication with the terminal device is operable in accordance with the second radio access technology following a handover, wherein the indication of the target radio resource configuration comprises a full radio resource configuration for communications between the target network infrastructure equipment and the terminal device in a case that the target network infrastructure equipment determines that communication with the terminal device is not operable in accordance with the second radio access technology following the handover.

3. The method of claim 1, further comprising:

determining, at the target network infrastructure equipment, whether communication with the terminal device is operable in accordance with the second radio access technology following a handover, wherein the indication of the target radio resource configuration comprises an indication of differences between the source radio resource configuration and the target radio resource configuration in a case that the target network infrastructure equipment determines that communication with the terminal device is operable in accordance with the second radio access technology following the handover.

4. The method of claim 1, wherein the indication of the target radio resource configuration comprises an indication of differences between aspects of the source radio resource configuration relating to the first radio access technology and aspects of the target radio resource configuration relating to the first radio access technology.

5. The method of claim 1, further comprising:

releasing, at the terminal device, the source radio resource configuration for communications between the source network infrastructure equipment and the terminal device in accordance with the second radio access technology in response to receiving the radio resource configuration command message.

6. The method of claim 1, wherein the source network infrastructure equipment is operable to communicate with the terminal device in accordance with the first radio access technology and the second radio access technology in a time multiplexed manner.

7. The method of claim 1, wherein the source network infrastructure equipment is operable to communicate with the terminal device in accordance with the first radio access technology and the second radio access technology on different component carriers of an aggregated carrier.

8. A source network infrastructure equipment in a wireless telecommunications system, the source network infrastructure equipment comprising:

controller circuitry and transceiver circuitry configured to operate together to:

establish that a terminal device should be handed over from the source network infrastructure equipment to a target network infrastructure equipment in the wireless telecommunications system, wherein the source network infrastructure equipment is operable to communicate with the terminal device in accordance with a first radio access technology and a second radio access technology different from the first radio access technology, and the target network infrastructure equipment is operable to communicate with the terminal device in accordance with the first radio access technology and is not operable to communicate with the terminal device in accordance with the second radio access technology;

transmit, to the target network infrastructure equipment, a handover request message comprising an indication of a source radio resource configuration for communication between the source network infrastructure equipment and the terminal device, wherein the source radio resource configuration includes a first configuration of the first radio access technology for the terminal device with respect to the source network infrastructure equipment and a second configuration of the second radio access technology for the terminal device with respect to the source network infrastructure equipment;

receive from the target network infrastructure equipment a handover request acknowledgement message comprising an indication of a target radio resource configuration for communications between the target network infrastructure equipment and the terminal device in accordance with only the first radio access technology; and transmit to the terminal device in response to reception of the handover request acknowledgement message, a radio resource configuration command message including the indication of the target radio resource configuration and an indication to release an entirety of the second configuration of the second radio access technology, wherein the source network infrastructure equipment is operable to communicate with the terminal device using a radio bearer supported by a first layer 2-protocol stack for communications in accordance with the first radio access technology and a second layer 2-protocol stack for communications in accordance with the second radio access technology, the first radio access technology is long term evolution (LTE) technology and the first configuration is an LTE configuration, and the second radio access technology is new radio (NR) technology and the second configuration is an NR configuration.

9. A terminal device, comprising:

controller circuitry and transceiver circuitry configured to operate together to:

establish that the terminal device is to be handed over from a source network infrastructure equipment in a wireless telecommunications system to a target network infrastructure equipment in the wireless telecommunications system, wherein the source network infrastructure equipment is operable to communicate with the terminal device in accordance with a first radio access technology and a second radio access technology different from the first radio access technology, and the target network infrastructure equipment is operable to communicate with the terminal device in accordance with the first radio access technology and is not operable to communicate with the terminal device in accordance with the second radio access technology;

receive, from the source network infrastructure equipment, a radio resource configuration command message including an indication of a target radio resource configuration for communications between the target network infrastructure equipment and the terminal device in accordance with the first radio access technology, and an indication to release; and communicate with the at least one of the source network infrastructure equipment and the target network infrastructure equipment using a radio bearer supported by a first layer 2-protocol stack for communications in accordance with the first radio access technology and a second layer 2-protocol stack for communications in accordance with the second radio access technology, wherein

27

28 the indication of the target radio resource configuration is based on the source network infrastructure equipment having sent a handover request message to the target network infrastructure equipment, the handover request message comprising an indication of a source radio resource configuration for communications between the source network infrastructure equipment and the terminal device, the source radio resource configuration includes a first configuration of the first radio access technology for the terminal device with respect to the source network infrastructure equipment, and a second configuration of the second radio access technology for the terminal device with respect to the source network infrastructure equipment, the indication to release indicates to release an entirety of the second configuration of the second radio access technology, the first radio access technology is long term evolution (LTE) technology and the first configuration is an LTE configuration, and the second radio access technology is new radio (NR) technology and the second configuration is an NR configuration.

10. A method of operating a target network infrastructure equipment in a wireless telecommunications system, the method comprising:

receiving a handover request message from a source network infrastructure equipment in the wireless telecommunications system, wherein the source network infrastructure equipment is operable to communicate with the terminal device in accordance with a first radio access technology and a second radio access technology different from the first radio access technology, the target network infrastructure equipment is operable to communicate with the terminal device in accordance with the first radio access technology and is not operable to communicate with the terminal device in accordance with the second radio access technology, the handover request message comprises an indication of a source radio resource configuration for communications between the source network infrastructure equipment and the terminal device, and the source radio resource configuration includes a first configuration of the first radio access technology for the terminal device with respect to the source network infrastructure equipment and a second configuration of the second radio access technology for the terminal device with respect to the source network infrastructure equipment; and transmitting, to the source network infrastructure equipment, a handover request acknowledgement message comprising an indication of a target radio resource configuration for communications between the target network infrastructure equipment and the terminal device in accordance with only the first radio access technology, wherein the target network infrastructure equipment is operable to communicate with the terminal device using a radio bearer supported by a first layer 2-protocol stack for communications in accordance with the first radio access technology and a second layer 2-protocol stack for communications in accordance with the second radio access technology, wherein a radio resource configuration command message is transmitted from the source network infrastructure equipment transmits to the terminal device and in response to reception of the handover request acknowledge message, the radio resource configuration command message including the indication of the target radio resource configuration and an indication to release an entirety of the second configuration of the second radio access technology, the first radio access technology is long term evolution (LTE) technology and the first configuration is an LTE configuration, and the second radio access technology is new radio (NR) technology and the second configuration is an NR configuration.

11. The method of claim 10, wherein the indication of the target radio resource configuration for communications between the target network infrastructure equipment and the terminal device comprises an indication of a change in radio resource configuration from the source radio resource configuration to the target in radio resource configuration that applies to only some, and not all, layers in the second layer 2-protocol stack.

* * * * *